United States Patent
Sills et al.

(10) Patent No.: US 9,542,364 B2
(45) Date of Patent: Jan. 10, 2017

(54) TEARABLE DISPLAYS WITH PARTIAL TEARS DEFINED BY EXTRAPOLATED PATHS

(71) Applicant: GOOGLE INC., Mountain View, CA (US)

(72) Inventors: Max Andrew Sills, San Francisco, CA (US); Robert Samuel Gordon, San Bruno, CA (US)

(73) Assignee: Google Inc., Mountain View, CA (US)

(*) Notice: Subject to any disclaimer, the term of this patent is extended or adjusted under 35 U.S.C. 154(b) by 188 days.

(21) Appl. No.: 14/521,933

(22) Filed: Oct. 23, 2014

(65) Prior Publication Data

US 2016/0117288 A1    Apr. 28, 2016

(51) Int. Cl.
| | | |
|---|---|---|
| H03M 7/30 | (2006.01) | |
| G06F 17/21 | (2006.01) | |
| G06F 3/14 | (2006.01) | |
| G06F 1/16 | (2006.01) | |
| G06Q 30/02 | (2012.01) | |
| G09F 9/302 | (2006.01) | |
| G09G 5/373 | (2006.01) | |

(52) U.S. Cl.
CPC ........... *G06F 17/212* (2013.01); *G06F 1/1641* (2013.01); *G06F 3/1446* (2013.01); *G06Q 30/0251* (2013.01); *G09F 9/3023* (2013.01); *G09G 5/373* (2013.01); *G09G 2340/04* (2013.01); *G09G 2354/00* (2013.01); *G09G 2380/04* (2013.01)

(58) Field of Classification Search
CPC .... G06F 17/212; G06F 1/1641; G06F 3/1446; G06Q 30/0251; G09F 9/3023; G09G 5/373

USPC .......................................................... 715/252
See application file for complete search history.

(56) References Cited

U.S. PATENT DOCUMENTS

| | | |
|---|---|---|
| 8,490,860 B2 | 7/2013 | Cohen et al. |
| 8,511,563 B2 | 8/2013 | Cohen et al. |
| 8,517,251 B2 | 8/2013 | Cohen et al. |
| 8,581,859 B2 | 11/2013 | Okumura et al. |

(Continued)

FOREIGN PATENT DOCUMENTS

EP    2581808    4/2013

OTHER PUBLICATIONS

International Search Report and Written Opinion in International Application No. PCT/US2015/056523, mailed Jan. 12, 2016, 12 pages.

(Continued)

*Primary Examiner* — Cesar Paula
*Assistant Examiner* — Luu-Phuong Nguyen
(74) *Attorney, Agent, or Firm* — Fish & Richardson P.C.

(57) ABSTRACT

Methods, systems, and apparatus, including computer programs encoded on computer storage media, for presenting content on tearable displays. One of the methods includes presenting, by a device having a tearable display, first content on the tearable display; receiving, at the device, an indication of a tear in the tearable display, the tear in the tearable display defining a first portion and a second portion of the tearable display; in response to receiving the indication, determining, by the device, a size of the second portion of the tearable display; and presenting, by the device, second content within the second portion of the tearable display including sizing the second content according to the size of the second portion of the tearable display.

18 Claims, 6 Drawing Sheets

(56) References Cited

U.S. PATENT DOCUMENTS

| | | | |
|---|---|---|---|
| 8,596,521 | B2 | 12/2013 | Cohen et al. |
| 8,624,833 | B2 | 1/2014 | Cohen et al. |
| 8,803,816 | B2 | 8/2014 | Kilpatrick, II et al. |
| 2003/0071832 | A1 | 4/2003 | Branson |
| 2004/0155833 | A1 | 8/2004 | Ishii et al. |
| 2006/0238494 | A1 | 10/2006 | Narayanaswami et al. |
| 2010/0073334 | A1 | 3/2010 | Cohen et al. |
| 2010/0085277 | A1 | 4/2010 | Cohen et al. |
| 2010/0313150 | A1* | 12/2010 | Morris ............... G06F 9/4445 715/761 |
| 2011/0193771 | A1 | 8/2011 | Chronqvist |
| 2011/0209088 | A1* | 8/2011 | Hinckley ............ G06F 3/0488 715/810 |
| 2011/0209098 | A1* | 8/2011 | Hinckley ............ G06F 3/0483 715/863 |
| 2014/0049464 | A1 | 2/2014 | Kwak et al. |

OTHER PUBLICATIONS

JGalbo, "Sony Busts Out Flexible E-Ink Display, It's Like Paper . . . But Better," Jagbo [online], Sep. 17, 2010 [retrieved on Jun. 4, 2015]. Retrieved from the Internet: ULR<http://www.jagbo.com/2010/09/sony-busts-out-flexible-e-ink-display-its-like-paper-but-better/>, 3 pages.

McGlaun, "LG Showcases 5" Flexible OLED Technology at SID 2013," Daily Tech [online], May 20, 2013 [retrieved on Jun. 4, 2015]. Retrieved from the Internet: URL<http://www.dailytech.com/LG+Showcases+5+Flexible+OLED+Technology+at+SID+2013/article31581.htm>, 5 pages.

Takamatsu et al., "Transparent conductive-polymer strain sensors for touch input sheets of flexible displays," Journal of Micromechanics and Microengineering, vol. 20, Issue 7, pp. 1-6, Jun. 2010.

Wei, "Nokia Kinetic device demo," The Verge [online], Nov. 1, 2011 [retrived on Jun. 4, 2015]. Retrieved from the Internet: URL<http://www.theverge.com/2011/10/31/2527890/nokia-kinetic-device-demo>, 3 pages.

Wikipedia [online]. "Flexible electronics," Jul. 2014 [retrieved on Jun. 4, 2015]. Retrieved from the Internet: URL<http://en.wikipedia.org/wiki/Flexibie_electronics>, 8 pages.

Wikipedia [online]. "Strain gauge," Jul. 2014 [retrieved on Jun. 4, 2015]. Retrieved from the Internet: URL<http://en.wikipedia.org/wiki/Strain_gauge>, 7 pages.

* cited by examiner

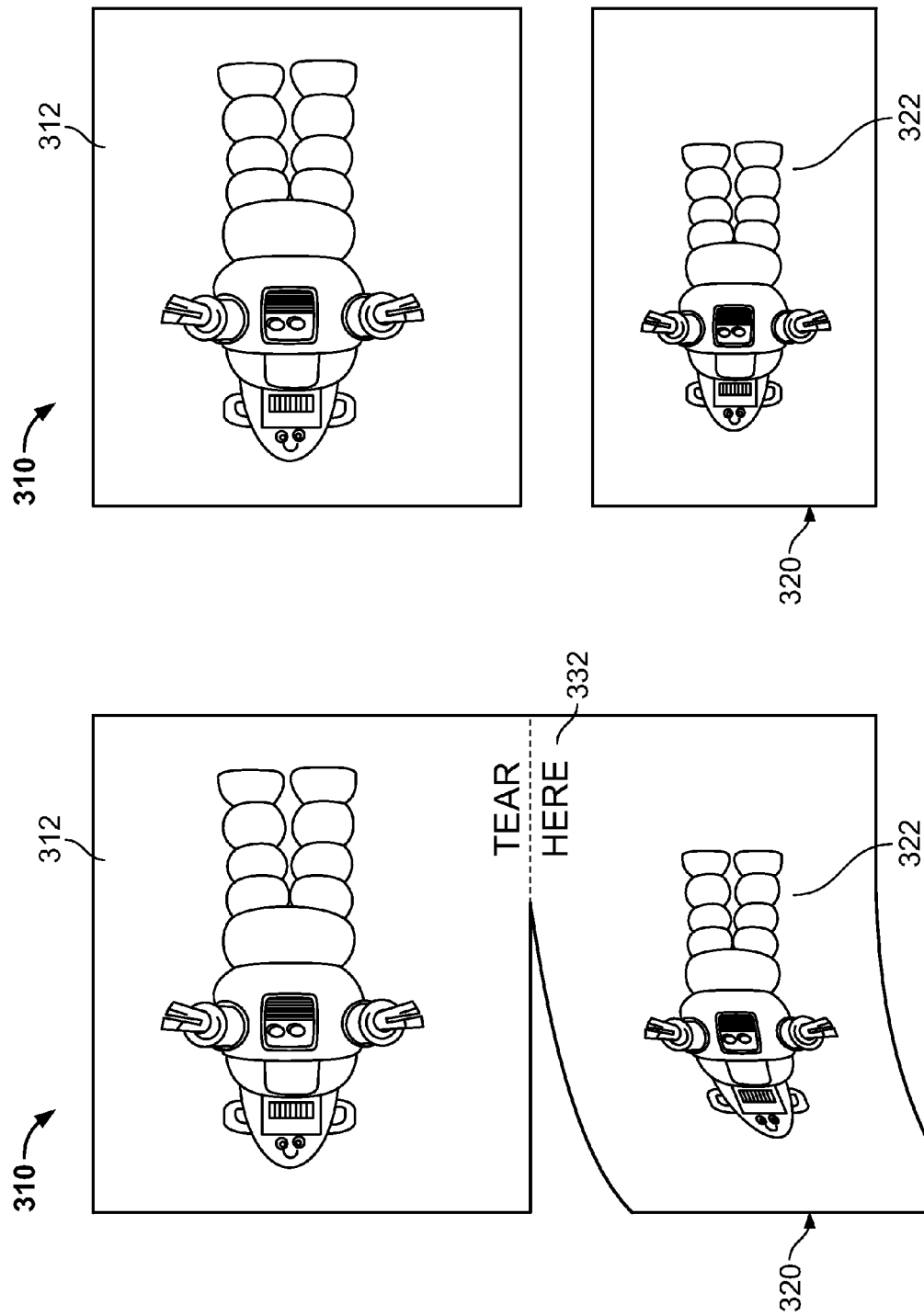

TEARABLE DISPLAYS WITH PARTIAL TEARS DEFINED BY EXTRAPOLATED PATHS

BACKGROUND

This specification relates to information displays, and more particularly to information displays that can be physically altered by a user.

Some conventional digital information displays can respond to physical manipulation or direct physical input from a user by altering the information shown on the display. In some cases, interacting with a device through physical manipulation of the device can benefit user experience and provide efficient means for communicating with the device. For example, a conventional touchscreen display device can use pressure from a tool or a user's finger on the display to alter the information shown and to issue commands to the device.

SUMMARY

This specification describes a device having a tearable display. The tearable display is a display that can present content and that can be physically separated, e.g., torn into portions by a user. Each resulting portion of the display can alter the content presented based, in part, on the characteristics of the tearing. The tearable display can be made of multiple connected display elements that collectively present any appropriate content capable of being presented on a display, including graphics, text, video, or other content.

Particular embodiments of the subject matter described in this specification can be implemented so as to realize one or more of the following advantages. Tearing off portions of a display can be used as a mode of user interaction. A tearable display provides easy sharing of information. For example, a user can tear a portion of a display to transfer content to the torn portion. A tearable display allows digital information to be portable and physically sharable. For example, a portion torn off a display can present content from the original display and can be easy for a user to transport or share with others by virtue of being smaller than the original display. A tearable display can be modular, having portions that can be reattached to the remaining portion of the display or to another display or portion of a display. The torn portion can be reattached to a display in a configuration or position different from the portion's original configuration or position.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-D are diagrams that illustrate an example implementation of an example tearable display.

Like reference numbers and designations in the various drawings indicate like elements.

DETAILED DESCRIPTION

Figure 1B:
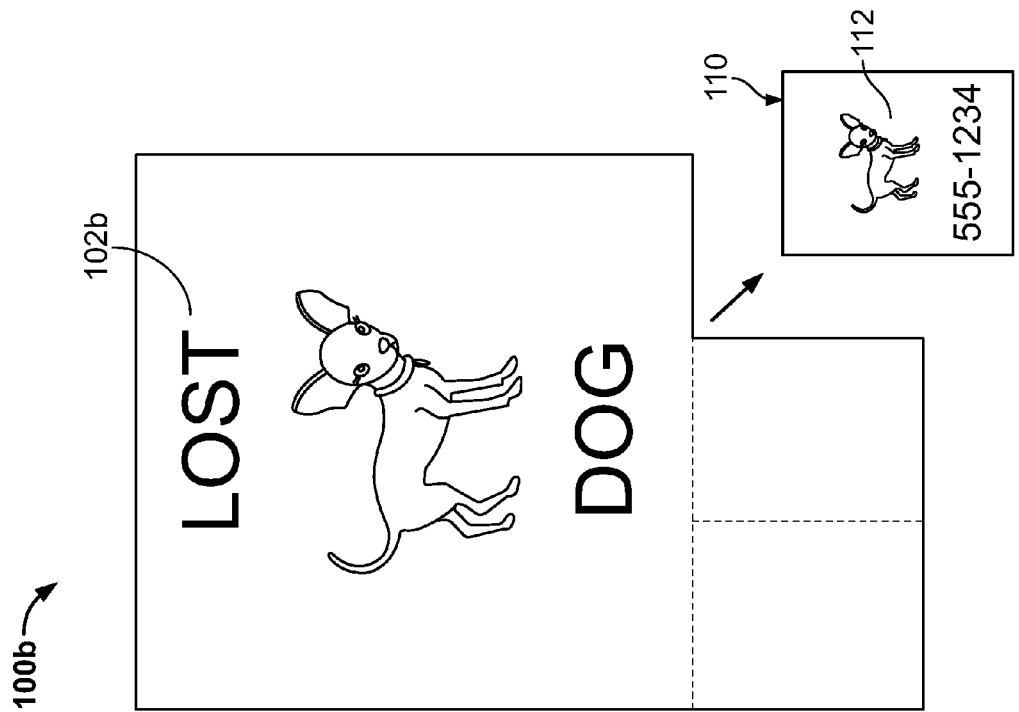
FIGS. 1A-B are diagrams that illustrate an example implementation of an example tearable display.
Figure 1A:
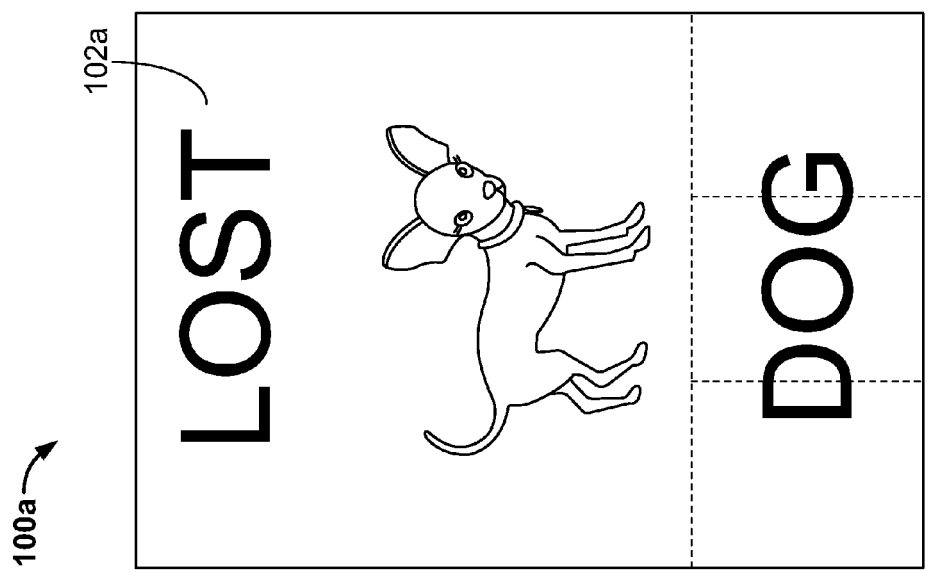

FIGS. 1A-B are diagrams that illustrate an example implementation of an example tearable display. In FIG. 1A, the tearable display 100a has a single portion, e.g., the tearable display 100a has not yet been torn. The tearable display 100a presents example first content 102a.

FIG. 1B illustrates two portions of the example tearable display 100a after the tearable display 100a has been torn. For example, a user of the tearable display 100a can tear the display 100a along perforated lines 103. The tearing action by the user defines a first portion 100b of the original tearable display 100a and a second portion 110 of the original tearable display 100a.

Each of the first portion 100b and the second portion 110 are themselves functioning computing devices that can present content, with each portion having at least one processor, computer readable media, and a power supply. For example, upon receiving an indication of being detached, the second portion 110 can present second content 112. Additionally, upon receiving the indication of a tear, the first portion 100b of the tearable display 100a can present third content 102b. The second portion 110 can present second content 112 that is different from the third content 102b presented by the first portion 100b and different from the first content 102a presented by the original tearable display 100a.

Each portion can present content according to the dimensions of the portions resulting from the tear. In some cases, the second portion 110 presents the second content 112 as a resized or altered version of the first content 102a presented by the tearable display 100a or the third content presented by first portion 100b. For example, the second portion 110 can present a version of the first content 102a that is rotated, repositioned, or recolored, to name just a few examples.

To determine how content should be presented, each portion of the display can determine its own size after the tear. Determining a size of a portion of the tearable display will be described in more detail below with reference to FIG. 4A.

After determining its own size, the second portion 110 can then resize the second content 112 according to the determined size of the separated second portion 110. For example, a larger second portion 110 torn off can present a larger version of the second content 112 than a smaller second portion 110 torn off. The size of the untorn tearable display 100a can be a first size, and the size of the torn first portion 100b can be a second size that is different from the first size. The third content 102b presented on the first portion 102b can also be sized according to the second size of the first portion 102b.

Tearable displays can be used for a number of useful applications. In the example implementation shown in FIGS. 1A-B, the first content 102a presented on a tearable display 100a that presents a "LOST DOG" flier. A user can post the tearable display 100a in a public place so that others may see the flier.

Another person that sees the flier can tear off the second portion 110 of the tearable display 100a. In response to tearing off a portion 110, the first portion 100b resizes the first content 102a to be properly presented as third content 102b. After tearing, the second portion 110 presents the second content 112 to the other person. In this example, the second content 112 is a picture of the lost dog and a phone number to call if the dog is found. The second content 112 can also include a series of changing pictures of the lost dog or a video of the lost dog. The second portion 110 sizes the second content 112 so that the second content 112 is appropriately presented on the second portion 110. In this manner, information about the lost dog and how to reach the owner can be easily taken and carried by an interested person.

Figure 2A:
FIGS. 2A-C are diagrams that illustrate an example implementation of an example tearable display.
Figure 2B:
Figure 2C:
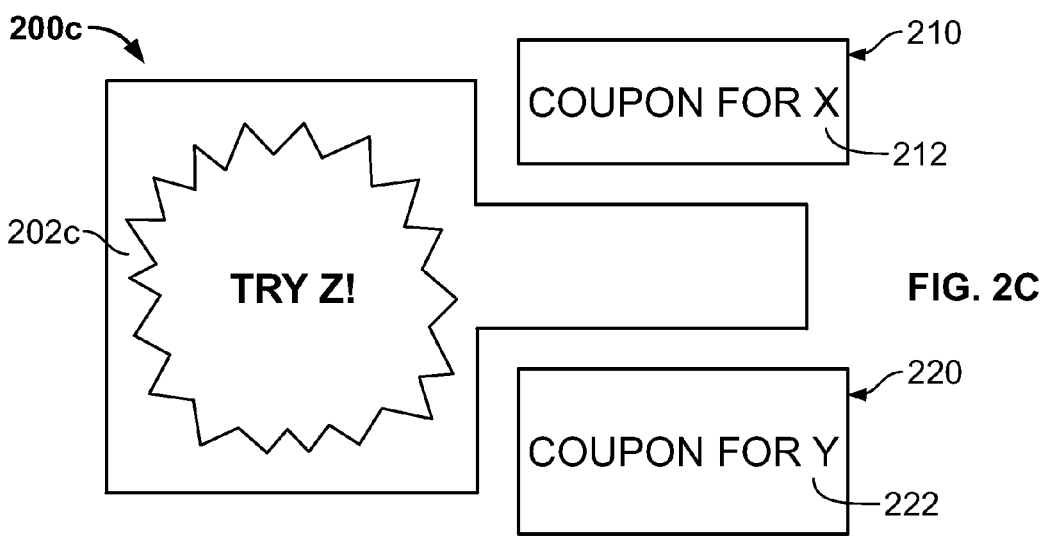

FIGS. 2A-C are diagrams that illustrate an example implementation of an example tearable display 200a. In FIG. 2A, the tearable display 200a presents first content 202a. In this example implementation, the first content 202a is an advertisement for Product X and Product Y. The tearable display 200a can be posted in a supermarket in an aisle that sells Product X and Product Y. Customers walking down the aisle can acquire coupons for purchasing Product X and Product Y by tearing off portions of the tearable display 200a.

FIG. 2B illustrates two portions of the tearable display 200a after a portion 210 has been torn off, e.g., torn off by a user. The tear separates the display 200a into a first portion 200b and a second portion 210. The second portion 210 presents second content 212 which is a coupon for Product X. The second portion 210 has sized the second content 212 appropriately according to the size of the second portion 210. The first portion 200b now presents third content 202b, sized appropriately in response to determining the dimensions of the tear for presentation by the first portion 200b.

FIG. 2C illustrates the tearable display 200c after another portion 220 has been torn off. The second tear separates the first portion 200b into a first portion 200c and a third portion 220. The third portion presents fourth content 222, which is a coupon for Product Y. The third portion 220 has sized the fourth content 222 appropriately according to the size of the third portion 220. The first portion 200c now presents fifth content 202c, sized appropriately in response to the first portion 200c determining the dimensions of the tear.

In FIGS. 2A-C, the example tearable display 200a can alter the content presented on a portion of the tearable display based, in part, on the number of torn portions. For example, the tearable display 200a can determine that one portion has been torn and can then present content on one or more of the two portions. The tearable display 200a can also determine that two portions have been torn and present the same or different content on one or more of the three portions. In some implementations, the tearable display presents the same content on each subsequent portion that is torn off.

In some implementations, the content of one or more portions can be altered depending on other characteristics of the tearing other than number of separated portions. For example, the content can be altered based, in part, on a direction of the tear, the size of a portion, the location of the tear, the location of the portion, the speed at which the tear is made, a number of incomplete tears, or another characteristic or sequence of characteristics or combination of characteristics. For example, one type of content can be presented if the portion is torn from a first location on the tearable display, and a second type of content can be presented if the portion is torn from a second location on the tearable display.

Figure 3B:
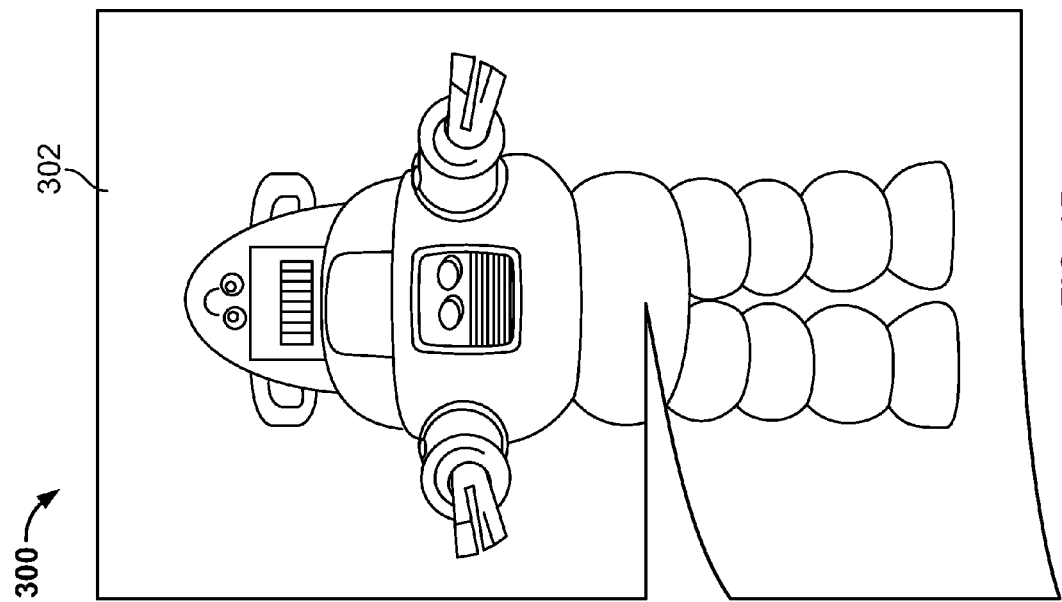
Figure 3A:
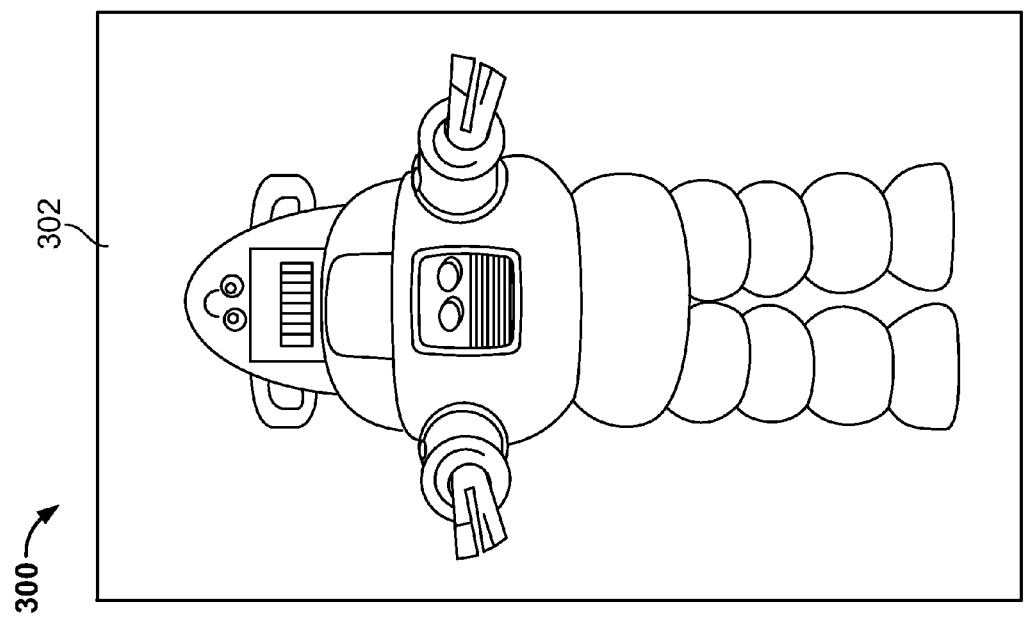

FIGS. 3A-D are diagrams that illustrate an example implementation of an example tearable display 300. In FIG. 3A, the tearable display 300 presents first content 302.

In FIG. 3B, the tearable display 300 has been partially torn, e.g., by a user. The tear is a partial tear that extends incompletely across a region of the tearable display 300. In some implementations, the tearable display 300 can continue to present the first content 302 even as the display 300 is partially torn, as shown in FIG. 3B. In some implementations, the tearable display 300 presents different or altered content as the display 300 is being torn. For example, the tearable display 300 can highlight a display region around the tear while the display 300 is being torn by a user. In some implementations, the tearable display 300 can extrapolate a path between an end of a partial tear and an edge of the tearable display 300, and can present content along the extrapolated path.

In some implementations, the tearable display 300 alters the content being presented according to a degree of the partial tear in the tearable display 300. For example, the degree can be based on the length of the partial tear. In some implementations, the tearable display 300 alters the content 302 presented only when the degree of the partial tear satisfies a threshold. For example, if a tear exceeds a specific length or a specific fraction or percentage of a dimension of the display, the display 300 can alter the content 302. For example, the display 300 can move a position of the content in order to avoid presenting the content on the tear.

FIG. 3C illustrates example tearable display 300 after the partial tear has satisfied a length threshold. In response to determining that the tear satisfies the threshold amount, the tearable display 300 presents content in a first portion 310 and a second portion 320. Also in response to the determination, the second portion 320 presents a second content 322, and the first portion 310 presents a fourth content 312. In this example, the second content 322 and the fourth content 312 are resized and rotated versions of the first content 302.

The tearable display 300 can determine the respective sizes of the first portion 310 and the second portion 320 and can present the fourth content 312 and the second content 322 accordingly.

The tearable display 300 can also determine a predicted size of the first portion 310 and the second portion 320. For example, the tearable display 300 can generate an extrapolated path between the end of the tear and the edge of the display 300 perpendicular to the direction of the tear. Along the extrapolated path, third content 332 is presented. In this example, the third content 332 highlights the extrapolated path and instructs the user to continue tearing. The tearable display 300 uses the extrapolated path to determine a predicted size for the first portion 310 and the second portion 320 and sizes the second content 322 and the fourth content 312 according to the predicted sizes.

FIG. 3D illustrates the example tearable display 300 after the tear fully separates the second portion 320 from the first portion 310. The first portion 310 continues to present the fourth content 312 and the second portion 322 continues to present the second content 322.

In some implementations, one of both of the portions alters the content displayed when a tear becomes a full tear by fully separating the two portions. For example, the first portion 310 can redisplay a version of the first content 302 when the tear is complete.

Figure 4A:
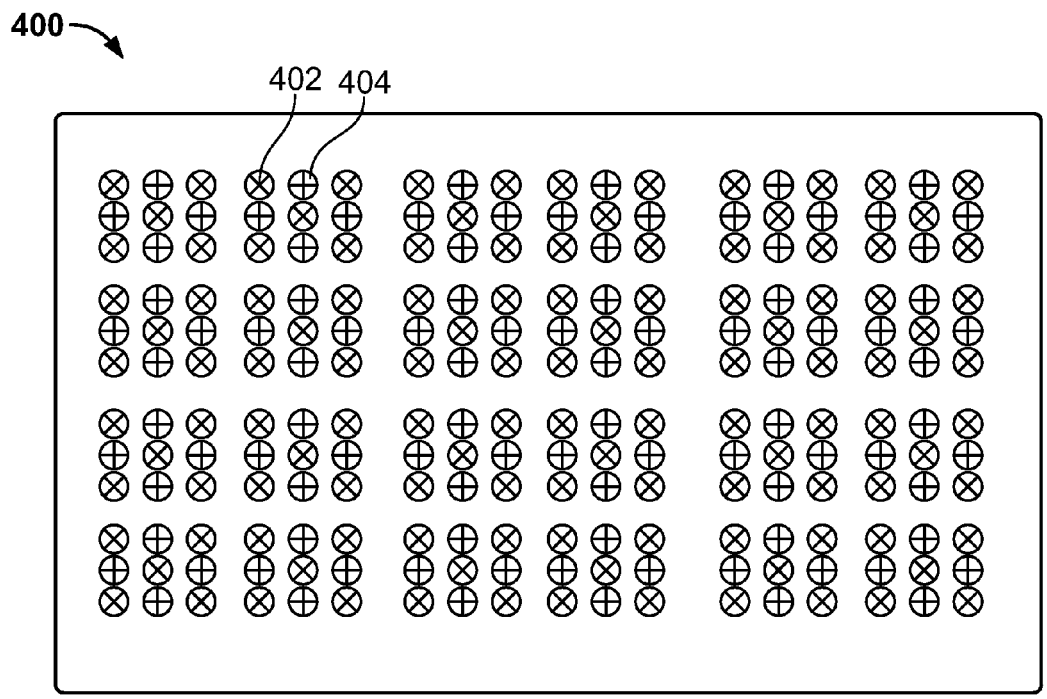
FIGS. 4A-B illustrates example implementations of a tearable display.
Figure 4B:
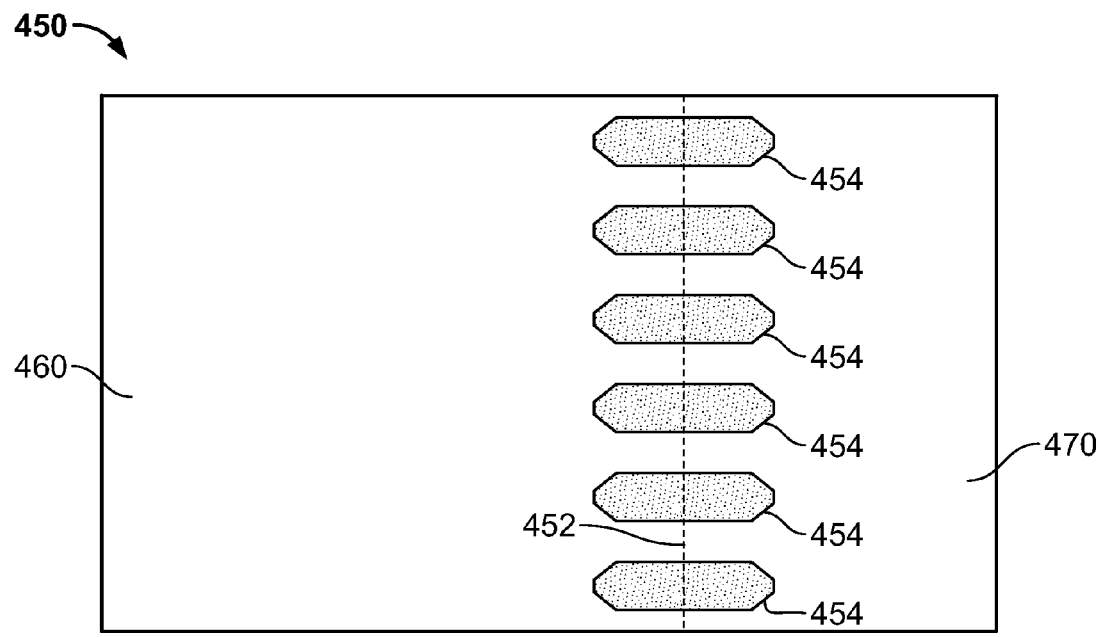

FIGS. 4A-B illustrates example implementations of a tearable display 400. FIG. 4A illustrates an example tearable display 400 that includes multiple display elements 402 and multiple sensors 404.

In general, the tearable display 400 is part of a device that includes one or more processors, a power supply, and computer storage media. Some of these elements may themselves be tearable. For example, the power supply can be a tearable photovoltaic cell. The one or more or more processors receive input from the sensors 404 in order to determine the output to provide to the display elements 402, for example, as described in more detail below with reference to FIG. 5.

In FIG. 4A, one example display element 402 and one example sensor 404 are labeled. The display elements 402 collectively present content on the tearable display 400. For example, a display element 402 can be an LED embedded in a substrate, an organic light-emitting diode (OLED), a fluidic element, e.g., electronic ink ("e-ink"), or another type of display element.

Typically, each portion into which the display 400 can be torn has at least one processor, a power supply, and computer-readable media. However, in some implementations, a torn portion of the display 400 need not have these elements. For example, in a display having fluidic elements, a processor in one portion of the display may alter the content in a portion of the display that is being torn off. After being torn off, the content as displayed by the fluidic elements is set and may not require a processor or computer-readable media for the content to remain visible to a user.

The tearable display 400 can include multiple types of display elements 402. For example, in FIG. 1B, the first portion 102b may be a bright OLED display for attracting attention to the lost dog poster, and the second portion 110 that is torn off by a user may be an e-ink display that does not require a processor for the content to remain visible.

A processor embedded in a portion of the tearable display 400 can use the sensors 404 to determine that a full tear or a partial tear has occurred in the vicinity of the sensor 404. For example, the sensors 404 can be a strain sensor, and a separation of one or more strain sensors in a substrate of the tearable display 400 can indicate a full or partial tear. For example, the sensors 404 can be MEMS strain sensors, piezoelectric sensors, resistive sensors, or another type of sensor.

The tearable display 400 can include any appropriate number of display elements 402 or sensors 404. The display elements 402 and sensors 404 can arranged in an array as shown in FIG. 4A, or in another suitable arrangement.

Each portion of the tearable display 400 can determine its own size in a variety of ways. For example, the display 400 may include an embedded lattice of circuits. At various points within the lattice are circuit components that communicate regularly with one or more nearby processors in the display 400. Each processor can then determine both how many circuit components can connect to it or how many other processors it can communicate with to determine a size of the portion that has been torn.

Each processor can also maintain a location of sensors 404 in the lattice. A processor can then determine a size of its portion of the display by performing a boundary scan of a sensor bus connecting the sensors.

Each processor can use similar interactions with the sensors 404 to determine other properties of a tear. For example, a processor can use the input of the sensors 404 to determine a degree of a partial tear in the display 400 based on a number of sensors 404 that report a disconnection and respective distances between the sensors 404.

Connections between the display elements 402 can be physical electronic connections that allow the transmission of data between the display elements 402. In some implementations, the display elements 402 have physical connections in order to maintain physical contact. The display elements 402 may also have access to a wireless connection for data transmission and communication.

Connections between sensors 404 can be torn apart to separate the display 400 into portions, with each portion containing at least one display element 402. The connections of the sensors 404 can define paths of connections on the device, and the display can be torn along these paths. In some implementations, the substrate is perforated along the paths along which the display can be torn.

The portions into which the device can be torn can have a rectangular shape, a triangular shape, an irregular shape, or another shape. The display 400 can consider a portion to be completely torn from the display 400 when the portion is separated such that there are no longer physical connections between sensors 404 in the remaining portion and sensors 404 in the torn portion. For example, a physical connection can be torn between sensors 404 when the connective components of the sensors 404 are no longer touching. A portion can be torn via separation by a force such as pulling, bending, or twisting, to name just a few examples.

FIG. 4B illustrates an example implementation of a tearable display 450 including coupling elements 454. The coupling elements 454 can be fasteners or attachments that couple a first portion 460 to a second portion 470. The coupling elements 454 can provide a tearable physical attachment between the first portion 460 and the second portion 470. For example, during tearing, coupling elements 454 can break or disconnect from a portion to allow the portions to separate.

To provide physical attachment, the coupling elements 454 can include magnetic fasteners, wires, plastic fasteners, paper fasteners, Velcro, snaps, zippers, or other types of attachments or connectors. The coupling elements 454 can also allow communication between the first portion 460 and the second portion 470 prior to separation. For example, the coupling elements 454 can include an electronic connector through which the portions can communicate, e.g., a wire, a conductive strip, a male-female electronic connector, or other electronic connector. In some implementations, the coupling elements 454 can be reattached after being torn.

The coupling elements 454 can also provide, to one or more processors of the first portion 460 or the second portion 470, an indication of a tear or partial tear. For example, a coupling element 454 can include a circuit between the first portion 460 and the second portion 470, e.g., a wire. The coupling element 454 can provide a tear indication to one or more processors when the circuit is broken during tearing. As another example, the coupling element 454 can include a magnetic fastener, and the coupling element 454 can provide a tear indication when the magnetic fastener is separated. In some implementations, the magnetic fastener includes a circuit that is broken when torn.

In some implementations, a torn connection can be reconnected. For example, a portion can be torn from a display along a path of magnetic fasteners and then later reconnected to the display along the path of magnetic fasteners.

In some implementations, the substrate of the tearable display 450 includes a corrugated line between the first portion 460 and the second portion 470. The corrugated line can define a path along which a portion can be torn. For example, the corrugated line can include perforations in a substrate of the tearable display 450, facilitating tearing along the corrugated line. Coupling elements 454 can be arranged along the corrugated line. Furthermore, display elements 402 and sensors 404 can be arranged on one or both sides of the corrugated line so that the tearable display 450 can operate fully with a partial tear or a full tear.

Figure 5:
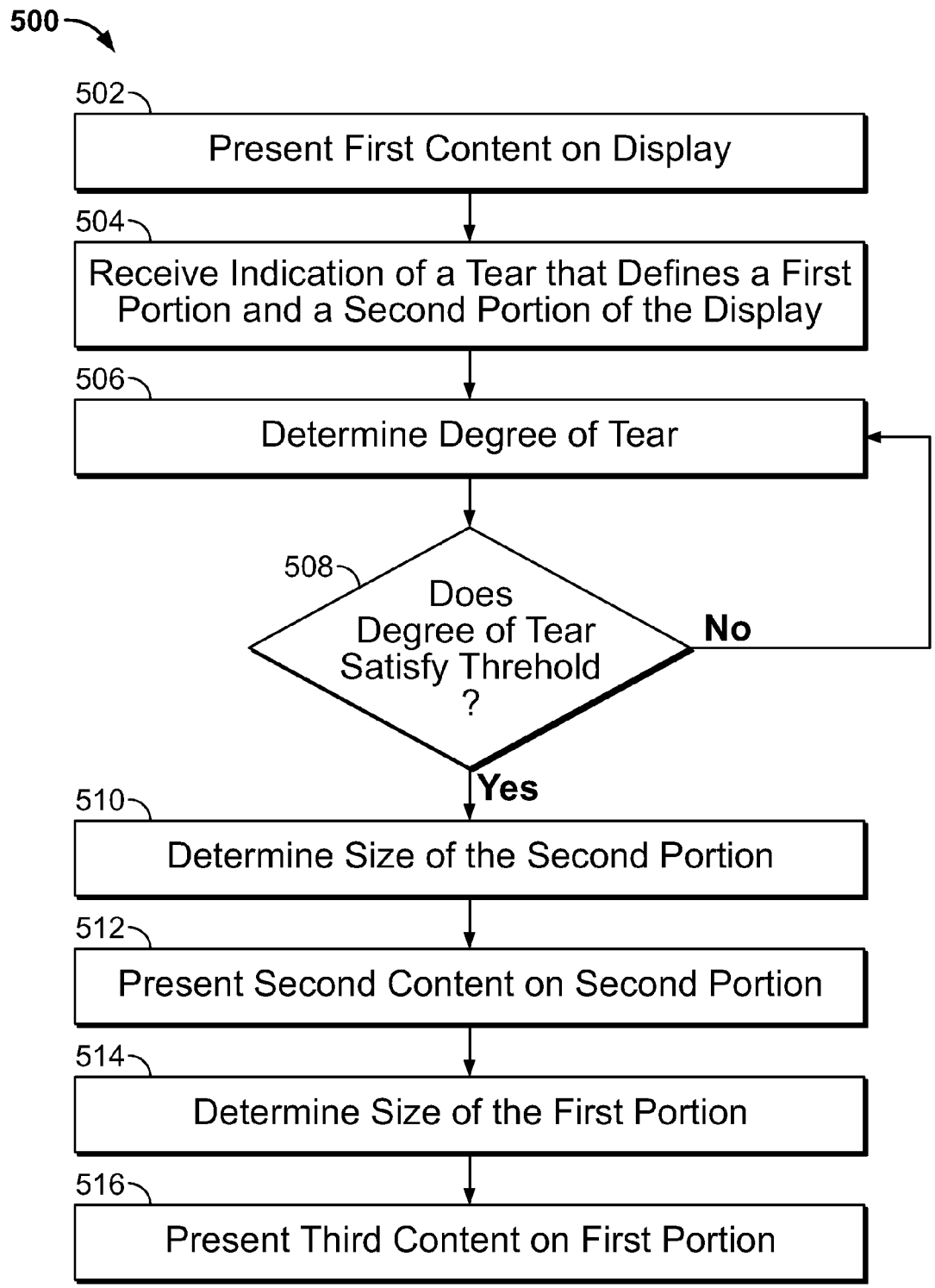
FIG. 5 is a flowchart of an example process that can be implemented by a tearable display device.

FIG. 5 is a flowchart of an example process 500 that can be implemented by a tearable display device. The process 500 can be implemented, for example, by the example tearable displays shown in FIGS. 1-4. The process will be described as being performed by a device having a tearable display.

The device presents a first content on the tearable display (502). Before the display is torn, the device can use all or a portion of the display to present content.

The device receives an indication of a tear in the tearable display (504). The tear can be indicated using sensors embedded in the display, as described above with reference to FIG. 4. The tear in the tearable display can define a first portion and a second portion of the tearable display.

The device determines a degree of the tear in the tearable display (506). For example, the device can receive input from disconnected sensors in the display in order to determine a length of the tear. In some implementations, the device determines the length of the tear based on the number of disconnected sensors.

The device determines whether the degree of the partial tear satisfies a threshold (508). If the degree of the partial tear does not satisfy the threshold, the device again determines the degree of the tear (branch to 506). The device may optionally wait for a particular amount of time before redetermining the degree of the tear. In this manner, the degree of the tear can be repeatedly determined and compared with the threshold.

If the degree of the tear satisfies the threshold, the device determines a size of the second portion of the tearable display (510). For example, the size can be an area of the second portion, a perimeter of the second portion, or a length of the second portion.

The device can determine the size of the second portion even if the tear is a partial tear. For example, the device can determine an extrapolated a path between an end of the tear and an edge of the device. In some implementations, the device considers a last separated sensor to designate the current end of the tear.

The device presents second content within the second portion of the tearable display (512). In some implementations, the device sizes the second content according to the size of the determined second portion of the tearable display. In some cases, the second content is a resized version of the first content.

The device can also present content along the torn path or along the predicted path of the tear. For example, the device can present instructions to keep tearing or present dotted lines along the predicted path to aid the user in completing the tear.

The device can also alter the content presented on the remaining portion of the display. For example, the device can determine a second size of the first portion of the tearable display. The size of the first portion will generally be smaller after a portion is torn off. Thus, the device can determine new reduced size of the first portion.

The device can then present updated content within the first portion of the tearable display. Presenting the content can include sizing the third content according to the size of the first portion of the tearable display. In some cases, the device presents the content in the first portion a resized version of the content that was first presented on the full display.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a LCD (liquid crystal display) monitor, or an OLED display, for displaying information to the user, as well as input devices for providing input to the computer, e.g., a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

As alternatives or additions to the attached claims and the embodiments described above, the following embodiments are also innovative:

Embodiment 1 is a method, the method comprising presenting, by a device having a tearable display, first content on the tearable display; receiving, at the device, an indication of a tear in the tearable display, the tear in the tearable display defining a first portion and a second portion of the tearable display; in response to receiving the indication, determining, by the device, a size of the second portion of the tearable display; and presenting, by the device, second content within the second portion of the tearable display including sizing the second content according to the size of the second portion of the tearable display.

Embodiment 2 is the method of embodiment 1, wherein the tear is a partial tear and further comprising repeatedly determining a degree of the partial tear in the tearable display, and wherein presenting the second content within the second portion of the tearable display comprises presenting the second content when the degree of the partial tear satisfies a threshold.

Embodiment 3 is the method of any one of embodiments 1 through 2, wherein the tear is a partial tear in the tearable display, and wherein determining the size of the second portion of the tearable display comprises determining an extrapolated path between an end of the tear and an edge of the tearable display.

Embodiment 4 is the method of embodiment 3, the further comprising presenting, on the tearable display, third content along the extrapolated path between the end of the tear and an edge of the tearable display.

Embodiment 5 is the method of embodiment 1, wherein the tear is a full tear in the tearable display that separates the second portion from the first portion, and wherein determining the size of the second portion of the tearable display comprises determining a size of the separated second portion.

Embodiment 6 is the method of any one of embodiments 1 through 5, wherein receiving the indication of the tear in the tearable display comprises receiving an indication of a broken circuit along a corrugated line in a substrate of the tearable display.

Embodiment 7 is the method of any one of embodiments 1 through 5, wherein receiving the indication of the tear in the tearable display comprises receiving an indication of a broken circuit along one or more magnetic fasteners in a substrate of the device.

Embodiment 8 is the method of any one of embodiments 1 through 5, wherein receiving the indication of the tear in the tearable display comprises receiving an indication of separation of one or more strain sensors in a substrate of the device.

Embodiment 9 is the method of any one of embodiments 1 though 8, the method further comprising determining a second size of the first portion of the tearable display; and presenting, by the device, third content within the first portion of the tearable display including sizing the third content according to the second size of the first portion of the tearable display.

Embodiment 10 is the method of embodiment 9, wherein presenting the third content within the first portion of the tearable display comprises presenting a resized version of the first content.

Embodiment 11 is a device comprising a tearable display; and one or more computers and one or more storage devices storing instructions that are operable, when executed by the one or more computers, to cause the one or more computers to perform operations comprising presenting, by the device, first content on the tearable display of the device; receiving, at the device, an indication of a tear in the tearable display, the tear in the tearable display defining a first portion and a second portion of the tearable display; in response to receiving the indication, determining, by the device, a size of the second portion of the tearable display; and presenting, by the device, second content within the second portion of the tearable display including sizing the second content according to the size of the second portion of the tearable display.

Embodiment 12 is the device of embodiment 11, wherein the tear is a partial tear and the operations further comprise repeatedly determining a degree of the partial tear in the tearable display, and wherein presenting the second content within the second portion of the tearable display comprises presenting the second content when the degree of the partial tear satisfies a threshold.

Embodiment 13 is the device of any one of embodiments 11 through 12, wherein the tear is a partial tear in the tearable display, and wherein determining the size of the second portion of the tearable display comprises determining an extrapolated path between an end of the tear and an edge of the tearable display.

Embodiment 14 is the device of embodiment 13, wherein the operations further comprise presenting, on the tearable display, third content along the extrapolated path between the end of the tear and an edge of the tearable display.

Embodiment 15 is the device of embodiment 11, wherein the tear is a full tear in the tearable display that separates the second portion from the first portion, and wherein determining the size of the second portion of the tearable display comprises determining a size of the separated second portion.

Embodiment 16 is the device of any one of embodiments 11 through 15, wherein receiving the indication of the tear in the tearable display comprises receiving an indication of a broken circuit along a corrugated line in a substrate of the tearable display.

Embodiment 17 is the device of any one of embodiments 11 through 15, wherein receiving the indication of the tear in the tearable display comprises receiving an indication of a broken circuit along one or more magnetic fasteners in a substrate of the device.

Embodiment 18 is the device of any one of embodiments 11 through 15, wherein receiving the indication of the tear in the tearable display comprises receiving an indication of separation of one or more strain sensors in a substrate of the device.

Embodiment 19 is the device of any one of embodiments 11 through 18, wherein the operations further comprise determining a second size of the first portion of the tearable display; and presenting, by the device, third content within the first portion of the tearable display including sizing the third content according to the second size of the first portion of the tearable display.

Embodiment 20 is the device of embodiment 19, wherein presenting the third content within the first portion of the tearable display comprises presenting a resized version of the first content.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
   presenting, by a device having a tearable display, first content on the tearable display;
   receiving, at the device, an indication of a partial tear in the tearable display;
   in response to receiving the indication of the partial tear in the tearable display, determining, by the device, an extrapolated path between an end of the partial tear and an edge of the tearable display, the extrapolated path defining a first portion and a second portion of the tearable display;
   determining, by the device, a size of the second portion of the tearable display defined by the extrapolated path; and
   presenting, by the device, second content within the second portion of the tearable display including sizing the second content according to the size of the second portion of the tearable display.

2. The method of claim 1, further comprising:
   repeatedly determining a degree of the partial tear in the tearable display, and wherein presenting the second content within the second portion of the tearable display comprises presenting the second content when the degree of the partial tear satisfies a threshold.

3. The method of claim 1, wherein the tearable display comprises an array of interspersed display elements and strain sensors embedded in a same substrate.

4. The method of claim 1, further comprising:
   presenting, by the device on the tearable display, third content that visually indicates the extrapolated path along an untorn portion of the display between the end of the tear and the edge of the tearable display.

5. The method of claim 1, wherein receiving the indication of the partial tear in the tearable display comprises receiving an indication of a broken circuit along a corrugated line in a substrate of the tearable display.

6. The method of claim 1, wherein receiving the indication of the partial tear in the tearable display comprises receiving an indication of a broken circuit along one or more magnetic fasteners in a substrate of the device.

7. The method of claim 1, wherein receiving the indication of the partial tear in the tearable display comprises receiving an indication of separation of one or more strain sensors in a substrate of the device.

8. The method of claim 1, further comprising:
   determining a second size of the first portion of the tearable display; and
   presenting, by the device, third content within the first portion of the tearable display including sizing the third content according to the second size of the first portion of the tearable display.

9. The method of claim 8, wherein presenting the third content within the first portion of the tearable display comprises presenting a resized version of the first content.

10. A device comprising;
    a tearable display; and
    one or more computers and one or more storage devices storing instructions that are operable, when executed by the one or more computers, to cause the one or more computers to perform operations comprising:
    presenting, by the device, first content on the tearable display of the device;
    receiving, at the device, an indication of a partial tear in the tearable display;
    in response to receiving the indication of the partial tear in the tearable display, determining, by the device, an extrapolated path between an end of the partial tear and an edge of the tearable display, the extrapolated path defining a first portion and a second portion of the tearable display;

determining, by the device, a size of the second portion of the tearable display defined by the extrapolated path; and presenting, by the device, second content within the second portion of the tearable display including sizing the second content according to the size of the second portion of the tearable display.

11. The device of claim 10, wherein the operations further comprise:

repeatedly determining a degree of the partial tear in the tearable display, and wherein presenting the second content within the second portion of the tearable display comprises presenting the second content when the degree of the partial tear satisfies a threshold.

12. The device of claim 10, wherein the tearable display comprises an array of interspersed display elements and strain sensors embedded in a same substrate.

13. The device of claim 12, wherein the operations further comprise:

presenting, by the device on the tearable display, third content that visually indicates the extrapolated path along an untorn portion of the display between the end of the tear and the edge of the tearable display.

14. The device of claim 10, wherein receiving the indication of the partial tear in the tearable display comprises receiving an indication of a broken circuit along a corrugated line in a substrate of the tearable display.

15. The device of claim 10, wherein receiving the indication of the partial tear in the tearable display comprises receiving an indication of a broken circuit along one or more magnetic fasteners in a substrate of the device.

16. The device of claim 10, wherein receiving the indication of the partial tear in the tearable display comprises receiving an indication of separation of one or more strain sensors in a substrate of the device.

17. The device of claim 10, wherein the operations further comprise:

determining a second size of the first portion of the tearable display; and presenting, by the device, third content within the first portion of the tearable display including sizing the third content according to the second size of the first portion of the tearable display.

18. The device of claim 17, wherein presenting the third content within the first portion of the tearable display comprises presenting a resized version of the first content.

* * * * *